US012720535B2

(12) United States Patent
Zhang et al.

(10) Patent No.: US 12,720,535 B2
(45) Date of Patent: Aug. 25, 2026

(54) SYSTEMS AND METHODS FOR REFERENCE SIGNALING DESIGN AND CONFIGURATION

(71) Applicant: ZTE CORPORATION, Shenzhen (CN)

(72) Inventors: Shujuan Zhang, Shenzhen (CN); Zhaohua Lu, Shenzhen (CN); Bo Gao, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 18/520,133

(22) Filed: Nov. 27, 2023

(65) Prior Publication Data

US 2024/0196393 A1 Jun. 13, 2024

Related U.S. Application Data

(63) Continuation of application No. PCT/CN2021/139185, filed on Dec. 17, 2021.

(51) Int. Cl.

*H04W 72/1268* (2023.01)
*H04W 72/23* (2023.01)

(52) U.S. Cl.

CPC ....... *H04W 72/1268* (2013.01); *H04W 72/23* (2023.01)

(58) Field of Classification Search

CPC . H04W 72/1268; H04W 72/02; H04W 72/23; H04L 5/0053; H04L 5/0091
See application file for complete search history.

(56) References Cited

U.S. PATENT DOCUMENTS

| | | | | |
|---|---|---|---|---|
| 12,171,001 | B2 * | 12/2024 | Gaal | H04W 72/21 |
| 12,267,841 | B2 * | 4/2025 | Wong | H04W 72/23 |
| 2018/0324872 | A1 * | 11/2018 | Babaei | H04W 72/543 |
| 2021/0250989 | A1 * | 8/2021 | Chin | H04W 76/27 |
| 2022/0038244 | A1 * | 2/2022 | Zhang | H04W 72/0446 |
| 2022/0124772 | A1 * | 4/2022 | Xu | H04W 4/40 |
| 2022/0191882 | A1 | 6/2022 | Lee et al. | |

(Continued)

FOREIGN PATENT DOCUMENTS

| | | | |
|---|---|---|---|
| CN | 113364498 | A | 9/2021 |
| EP | 3 876 625 | A1 | 9/2021 |

(Continued)

OTHER PUBLICATIONS

Sun et al., Entity Management Method, MAC Entity, System, and Computer Storage Medium, Dec. 14, 2017, WO, WO 2017211276 (Year: 2017).*

(Continued)

*Primary Examiner* — Michael K Phillips
(74) *Attorney, Agent, or Firm* — Foley & Lardner LLP

(57) ABSTRACT

The systems and methods of the present disclosure include a method including determining, by a first wireless communication device, a feature of an uplink (UL) element and (Continued)

transmitting, by the first wireless communication device, the UL element according to the feature of the UL element, where the feature of the UL element includes a relationship between a value of a first parameter of the UL element and a value of a second parameter of the UL grant, where the UL element is associated with one or more values of the first parameter.

18 Claims, 11 Drawing Sheets

(56) References Cited

U.S. PATENT DOCUMENTS

2023/0050524 A1* 2/2023 Lai ........................ H04W 72/12
2023/0388952 A1* 11/2023 Khoshkholgh Dashtaki .............. H04B 7/18513

FOREIGN PATENT DOCUMENTS

WO WO-2017211276 A1 * 12/2017 ............... H04L 9/40
WO WO-2020/127525 A1 6/2020
WO WO-2020/197338 A1 10/2020
WO WO-2020/198645 A1 10/2020
WO WO-2021/066013 A1 4/2021

OTHER PUBLICATIONS

Extended European Search Report for EP Appl. No. 21967748.1, dated Oct. 15, 2024 (11 pages).
International Search Report and Written Opinion for PCT Appl. No. PCT/CN2021/139185, mailed on Sep. 7, 2022 (7 pages).
Mediatek Inc., "Enhancement on multi-beam operation", 3GPP TSG RAN WG1 #106-e, R1-2107485, Aug. 27, 2021, e-Meeting (37 pages).
Moderator (CATT), "Moderator summary #3 on M-TRP simultaneous transmission with multiple Rx panels", 3GPP TSG RAN WG1 #106-e, R1-2108323, Aug. 27, 2021, e-Meeting (50 pages).
Moderator (LG Electronics), "Summary #4 of PDSCH/PUSCH enhancements (Scheduling/HARQ)", 3GPP TSG RAN WG1 #107-e, R1-2112714, Nov. 19, 2021, e-Meeting (118 pages).
Moderator (Vivo), "Feature lead summary on Enhancements on Multi-TRP inter-cell operation", 3GPP TSG RAN WG1 #107-e, R1-2112816, Nov. 19, 2021, e-Meeting (29 pages).
Nokia, "Introduction of further enhancements on MIMO for NR", 3GPP TSG-RAN WG1 Meeting #107-e, R1-2112483, Nov. 19, 2021, Electronic Meeting (89 pages).
Nokia, "Introduction of further enhancements on MIMO for NR", 3GPP TSG-RAN WG1 Meeting #107-e, R1-2112949, Nov. 19, 2021, Electronic Meeting (92 pages).

* cited by examiner

FIG. 9
Oct 1
Oct 2
Oct 3
Oct m+1
LCG0
LCG1
LCG2
LCG3
LCG4
LCG5
LCG6
LCG7
Buffer Size 1
Buffer Size 2
Buffer Size m

SYSTEMS AND METHODS FOR REFERENCE SIGNALING DESIGN AND CONFIGURATION

CROSS-REFERENCE TO RELATED APPLICATION

This application claims the benefit of priority under 35 U.S.C. § 120 as a continuation of International Patent Application No. PCT/CN2021/139185, filed on Dec. 17, 2021, the disclosure of which is incorporated herein by reference in its entirety.

TECHNICAL FIELD

The disclosure relates generally to wireless communications, including but not limited to systems and methods for configuring communication between a wireless communication device and multiple wireless communication nodes.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium for wireless communication between a wireless communication node and a wireless communication device. In some embodiments, the communication node is a user equipment (UE), a base station or a transmission-reception point (TRP). In some embodiments, the wireless communication device is UE. In some cases, multiple wireless communication nodes (e.g., TRPs) may be within a same cell. When the multiple wireless communication nodes are in a close proximity, communication by a wireless communication device with the multiple wireless communication nodes may cause conflicts or interference. In one aspect, communication by the wireless communication device with the multiple wireless communication nodes may be implemented on a more granular basis (e.g., with respect to each TRP) to improve performance for instance.

In some embodiments, a first wireless communication device can determine a feature of an uplink (UL) element. The UL element may include at least one of: data of a logical channel, a medium access control-control element (MAC-CE), uplink control information (UCI), scheduling request (SR), or a medium access control (MAC) entity, or a piece of information (e.g., information that can be transmitted in MAC-CE in MAC layer). The UL elements may be identified as being directed to the same TRP.

The feature of the UL element may include at least one of: a value of the first parameter of the UL element, a value of a second parameter of an UL grant, a relationship between the UL element and the UL grant, or a relationship between the value of the first parameter of the UL element and the value of the second parameter of the UL grant. The UL grant may include at least one of: a dynamically configured UL grant, a type I configured UL grant, or a type II configured UL grant. In some embodiments, the first wireless communication device can determine, according a received signaling, a value of a second parameter for an UL grant.

In some embodiments, the UL element is associated with one or more values of a first parameter. In some embodiments, the first parameter includes a fourth parameter and at least one of a serving cell index or a value of a priority. In some embodiments, the priority includes a first priority and a second priority. In some embodiments, an UL channel, that corresponds to the UL grant, includes UL elements with a same value of the first priority and with a same value of the first parameter. In some embodiments, the UL channel, that corresponds to the UL grant, includes UL elements with a same or different value of the second priority and with a same value of the first parameter. In some embodiments, at least one of the first parameter, the second parameter, the third parameter, or the fourth parameter includes at least one of: a parameter of an uplink channel; a parameter of an UL grant; a control resource set (CORESET) pool index; a transmission-reception point (TRP) index; an index of a PUSCH group; an index of a PUCCH group; a physical cell index (PCI); a combination of the PCI and a frequency parameter; an index of a logical channel group index; a set index of a set of logical channel groups; a medium access control (MAC) entity; an index of the MAC entity, an index of an UL grant group; an index of an UL element; an index of a spatial relationship; an index of a spatial relationship group; an index of an UL grant; or an index of a transmission configuration indicator (TCI) state group. In some embodiments, the UL element is selected for a UL grant according to a priority of the UL element among UL elements having a same value of the first parameter. In some embodiments, if the UL element is of a defined type, the UL element can be associated with a predetermined value of the first parameter. The defined type may include a common UL element.

In some embodiments, at least one of a serving cell, a bandwidth part (BWP) or a serving cell group includes more than one UL element set, wherein each of the more than one UL element set corresponds to a respective value of the first parameter. One serving cell group may correspond to more than one medium access control (MAC) entities.

In some embodiments, two or more parameters of the more than one MAC entities have a same value. A fifth parameter of a first MAC entity and a fifth parameter of a second MAC entity may have the same value. The first MAC entity and the second MAC entity may be from more than one MAC entities of the one serving cell group. In some embodiments, at least one MAC entity parameter is configured for each of the more than one MAC entities independently.

In some embodiments, at least one of: the first parameter and the second parameter are of a same type of parameter; the relationship between the UL element and the UL grant comprises an associated relationship between the UL element and the UL grant; the relationship between the value of the first parameter of the UL element and the value of the second parameter of the UL grant comprises that: the value of the first parameter of the UL element includes the value of the second parameter of the UL grant; or the relationship between the value of the first parameter of the UL element and the value of the second parameter of the UL grant comprises that: the value of the first parameter of the UL element and the value of the second parameter of the UL grant are same.

In some embodiments, the first wireless communication device may determine a value of a first parameter of an UL element according to at least one of: a rule, a signaling received from a wireless communication node, or a reporting transmitted by the first wireless communication device. The signaling may include at least one of: the value of the first parameter for a serving cell of the UL element; the value of the first parameter of the UL element; the value of the first parameter for an UL element group which includes the UL element; or the value of the first parameter for an UL element set which includes one or more groups, where at least one of the one or more groups includes the UL element. When determining the value of the first parameter of the UL element according to the rule, the value of the first parameter of the UL element may comprise at least one of: an index of the UL element, an index of an UL element group which includes the UL element, or an index of an UL element set which includes one or more groups, where at least one of the one or more groups includes the UL element. In some embodiments, the value of the first parameter of the UL element applies for all serving cells in a serving cell list of UL element. In some embodiments, each serving cell in the serving cell list of the UL element corresponds to a respective value of the first parameter. In some embodiments, the value of the first parameter of the UL element comprises a value of the first parameter of a scheduling request of the UL element. In some embodiments, one UL element group may correspond to one entry of a buffer size reporting.

In some embodiments, the first wireless communication device can transmit the UL element according to the feature of the UL element. In some embodiments, the first wireless communication device can transmit the UL element according to the UL grant, when the value of the first parameter of the UL element includes the value of the second parameter of the UL grant. In some embodiments, the first wireless communication device can transmit the UL element according to the UL grant, when the relationship between the value of the first parameter and the value of second parameter of the UL grant exists. In some embodiments, the first wireless communication device can transmit the UL element according to the UL grant, when the relationship between the UL element and an UL grant exists.

In some embodiments, the first wireless communication device can transmit the UL element based on an UL grant regardless of a value of a first parameter of the UL element, if the UL element is not configured with the value of the first parameter. In some embodiments, if the UL element is not configured with a value of a first parameter, the first parameter of the UL element includes all candidate values of the first parameter, such that the first wireless communication device can transmit the UL element based on the UL grant regardless of a value of a first parameter.

In some embodiments, when multiple UL elements are associated with a same value of a first parameter, the multiple UL elements can be multiplexed for transmission through one channel, or can be multiplexed to one medium access control control element (MAC-CE). The one channel or the one MAC-CE may be associated with a value of a second parameter, and the same value of the first parameter may correspond to the value of the second parameter. When a relationship between a first UL element and a second UL element exists, the first UL element and the second UL element can be multiplexed for transmission through one channel, or can be multiplexed to one MAC-CE. In some embodiments, when the relationship between the first UL element and the second UL element comprises at least one of: a relationship between the first UL element and the second UL element; a relationship between a first value of a first parameter of the first UL element and a second value of a third parameter of the second UL element; or that a first value of the first parameter of the first UL element includes the second value of the third parameter of the second UL element. In some embodiments, the one channel comprises a least one of: a transport channel or a physical channel.

In some embodiments, a wireless communication node receives, from a wireless communication device, an uplink (UL) element according to a feature of the UL element. The feature of the UL element may be determined by the wireless communication device.

The systems and methods presented herein include a novel approach for configuring communication between a wireless communication device and multiple wireless communication nodes. The wireless communication device may be a UE, and the wireless communication nodes may be TRPs or base stations. Multiple TRPs may be in a close proximity with each other within a same cell.

The wireless communication device may determine a value of first parameter of a UL element, and transmit the UL element based on the value of first parameter. The UL element may include at least one of: UL data of logical channel, MAC-CE, UCI, SR, or MAC entity. The first parameter may include a parameter of an uplink channel which includes a PUSCH, a PUCCH. The first parameter may include a parameter of a UL grant. If the UL grant is type I configured UL grant, a base station (or gNB, or a second UE) can configure the value of the first parameter for a type I configured UL grant. The first parameter may include at least one of: CORESET pool index, TRP index, PUSCH group index, PUCCH group index, physical cell index (PCI), a combination of PCI and frequency parameter, logical channel group index, set index of set of logical channel groups, MAC entity, or MAC entity index, UL grant group index, UL element group index.

The wireless communication device may transmit the UL element based on a UL grant, when the UL grant and the UL element are associated with same value of the first parameter. The wireless communication device may transmit the UL element based on a UL grant, when the UL grant and the UL element have a corresponding relationship. One UL element can be associated with one or more values of the first parameter. The UL grant may be dynamical UL grant, type I configured UL grant, Type II configured UL grant. If one UL element is not configured with a value of the first parameter, the UL element can be transmitted regardless of the value of the first parameter. If one UL element is not configured with a value of the first parameter, the value of the first parameter of the UL element may include all candidate values of the first parameter. The priority of UL element may be among logical channels with a same value of the first parameter. The one channel may include one of: transport channel, or physical channel. Multiple UL elements can be multiplexed for transmission through one channel when they are associated with same value of the first parameter.

Some type of UL element can be associated with a predetermined value of the first parameter. The first parameter of one of one serving cell, one BWP, or one serving cell group may have more than one value. One serving cell group may correspond to more than one MAC entities. Some parameters of the MAC entities may be the same. The parameter of the MAC entities may be configured independently.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
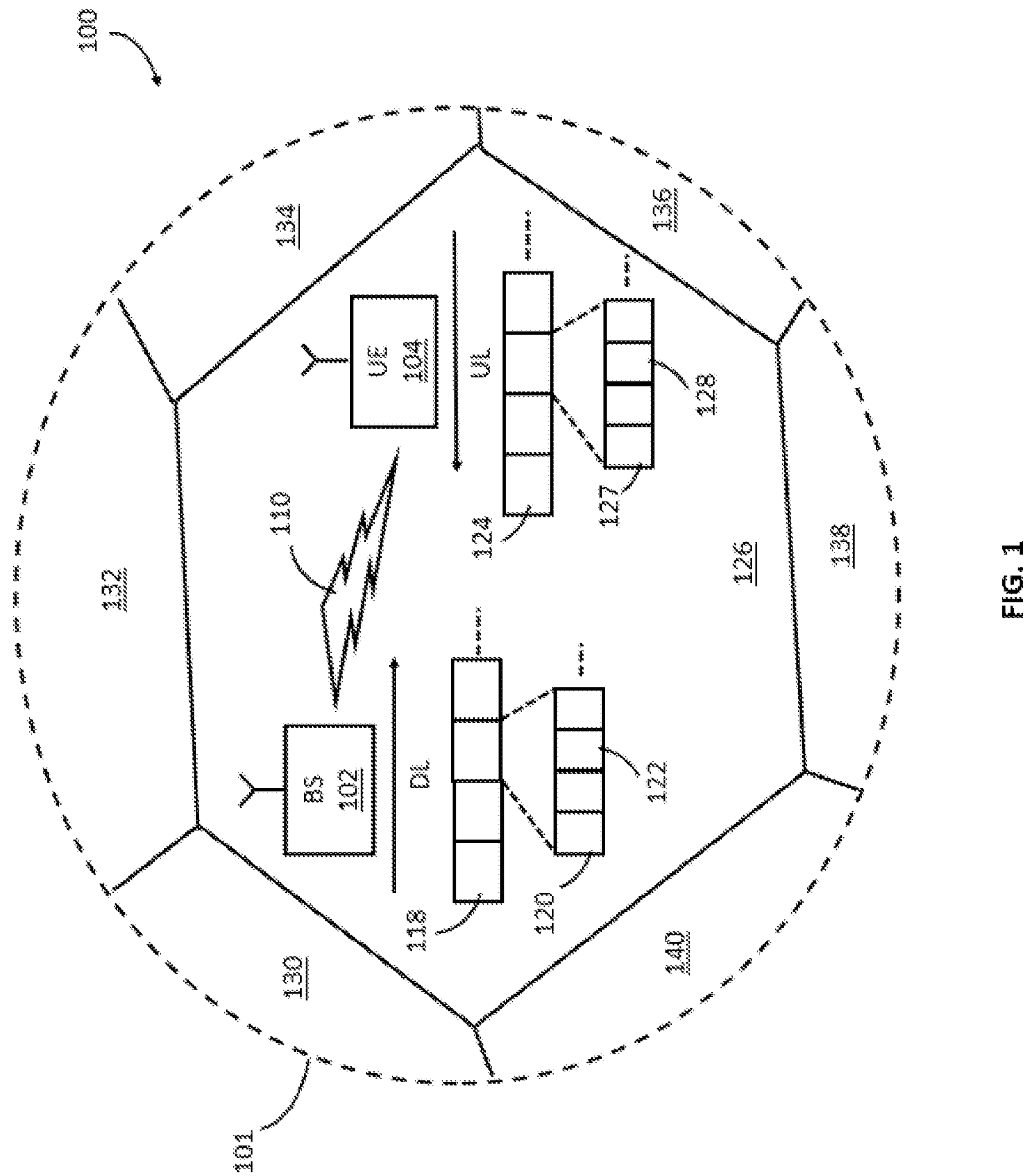
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
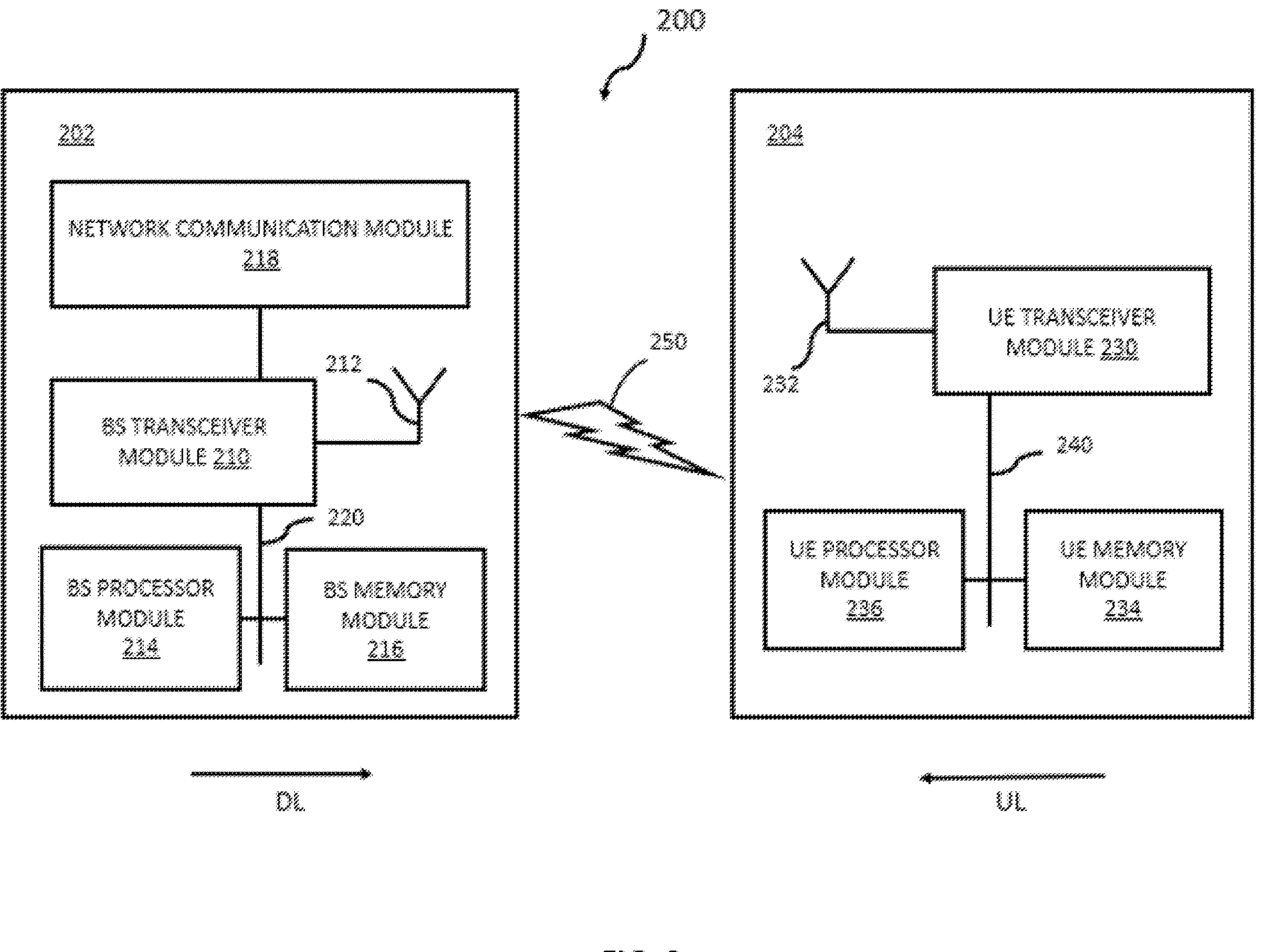
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication link 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 230 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), gNB, a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Configuring Communication Between Wireless Communication Device and Multiple Wireless Communication Nodes Disclosed herein are related to systems and methods for enabling a wireless communication device (e.g., UE) to transmit data of logical channel(s) (or UCI/MAC-CE/SR) independently to different wireless communication nodes (e.g., TRPs and/or base stations), where different wireless communication nodes may correspond to (or be located to or part of) a same serving cell, or a same BWP, and enabling scheduling of PUSCH/PUCCH of the different wireless communication nodes.

In certain systems (e.g., 5G new radio (NR), Next Generation (NG) systems, 3GPP systems, and/or other systems), a wireless communication device (e.g., UE) may communicate with multiple TRPs. TRPs may be within a same cell. In some cases, communication by a wireless communication device with multiple wireless communication nodes with the close proximity may cause conflicts or interference. In one aspect, communication by the wireless communication device with the multiple wireless communication nodes may be implemented/configured on a more granular basis (e.g., with respect to each TRP, rather than to the cell as a whole) to improve performance for instance.

When a wireless communication device (e.g., UE) communicates with multiple TRPs in a same cell, the wireless communication device (e.g., UE) can determine, for each TRP, a corresponding feature of a (UL) element for transmission. The UL element may include at least one of: data of a logical channel, a medium access control-control element (MAC-CE), uplink control information (UCI), scheduling request (SR), or a medium access control (MAC) entity. The feature of the UL element may include at least one of: a value of a first parameter of the UL element, a value of a second parameter of an UL grant, a relationship between the UL element and the UL grant, or a relationship between the value of the first parameter of the UL element and the value of the second parameter of the UL grant. The UL grant may include at least one of: a dynamically configured UL grant, a type I configured UL grant, or a type II configured UL grant.

The wireless communication device (e.g., UE) can transmit (e.g., send, configure, and/or schedule) the UL element according to the feature of the UL element. For example, the wireless communication device (e.g., UE) can transmit the UL element, according to the UL grant, when the first parameter of the UL element includes the value of the second parameter of the UL grant. For example, the wireless communication device (e.g., UE) can transmit the UL element according to the UL grant, when the relationship between the value of the first parameter and the value of second parameter of the UL grant exists. For example, the wireless communication device (e.g., UE) can transmit the UL element according to the UL grant, when the relationship between the UL element and an UL grant exists.

A. First Example Implementation of Determining Value of First Parameter of Logical Channel and Transmitting Data of Logical Channel Based on the Value of First Parameter In some embodiments, a wireless communication device (e.g., UE) and/or a wireless communication node (e.g., gNB, TRP, or another UE) can determine (e.g., receive, identify, detect, generate, calculate) a value of a first parameter of a logical channel. The wireless communication node (e.g., gNB, TRP, or another UE) can determine a value of a first parameter of a logical channel, and may provide/convey that to the wireless communication device for instance.

In some implementations, the wireless communication device (e.g., UE, or another UE) can transmit data through the logical channel based on a UL grant when the UL grant is associated with the value of the first parameter of the logical channel.

In some implementation, the wireless communication device corresponds to UE, and the wireless communication node corresponds to gNB, or another UE. In another implementation, the wireless communication device corresponds to a first UE, and the wireless communication node corresponds to a second UE. In some implementation, the first UE and the second UE communicate with each other through a side link.

In some implementation, the UE can transmit data from the logical channel based on a UL grant when the value of the first parameter of the UL element includes a value of second parameter of the UL grant. The first parameter and the second parameter can be same or different parameters.

In some implementations, one logical channel can be associated with one or more values of the first parameter. If one logical channel is associated with more than one value of the first parameter, then the wireless communication device (e.g., UE) can transmit data through the logical channel based on a UL grant when the UL grant is associated with any one or more values of the more than one value of the first parameter of the logical channel.

In some implementations, if the one logical channel is not configured with any value of the first parameter, then the wireless communication device (e.g., UE) can transmit data through the one logical channel based on a UL grant, e.g., regardless of the value of the first parameter, or regardless of the value of the first parameter associated with UL grant.

In some implementations, the UL grant includes at least one of: dynamic UL grant with a downlink control information (DCI), type I configured UL grant which is semi-statically configured by RRC signaling and can be transmitted without detecting DCI signaling, or type II configured UL grant which is semi-persistently configured by RRC signaling and is activated by a DCI signaling.

In some implementations, the priority of logical channel is among logical channels with/having a same value of the first parameter. The wireless communication device (e.g., UE) may select logical channel among logical channels according to the priority.

The priority may include at least one of a first priority or a second priority. The first priority may be a physical priority. The data of a logical channel can be transmitted based on a UL grant when the value of the first parameter of the logical channel includes the value of a second parameter of the UL grant and the value of the first priority of the logical channel includes the value of the first priority of the UL grant. The first priority of the UL grant may be included in the UL grant when the UL grant is a dynamical UL grant. In some implementation, one UL channel scheduled by one UL grant may include data of multiple logical channels which are with same value of first priority and with same value of first parameter. The first priority may be a physical layer priority associated with an indication in the dynamic grant DCI. The first priority have two candidate values (e.g., 0 and 1).

After selecting logical channels for a UL grant according to the first priority and the first parameter, the wireless communication device can further select, from the selected logical channels for the UL grant, one or more logical channels based on the second priority. The second priority may be a priority among logical channels whose candidate value can be 1~16. In some implementation, one UL channel scheduled by one UL grant can include data of multiple logical channels which are with different values of second priority and with same value of first parameter.

In some implementations, the wireless communication device (e.g., UE) will/can include data from multiple logical channels in one uplink channel when the multiple logical channels are associated with same value of the first parameter (e.g., of a same type of parameter). The UL channel may be associated with a value of second parameter, wherein the same value of the first parameter may correspond to the value of the second parameter. When multiple logical channels are associated with different values of the first parameters, then the data from the multiple logical channels will/can be transmitted on different UL channels. The UL channel may include UL physical channel, such as PUSCH, or PUCCH. The UL channel may include at least one of an UL physical channel or an UL transport channel.

In some implementations, the wireless communication device (e.g., UE) can multiplex data of a first logical channel and data of a second logical channel when a relationship between the first logical channel and the second logical channel exists (e.g., when a relationship exists between different parameters of the logical channels, types of parameters, and/or between the parameters' values). The relationship between the first logical channel and the second logical channel comprises at least one of: an association relationship between the first logical channel and the second logical channel; a relationship between a first value of a first parameter of the first logical channel and a second value of a third parameter of the second logical channel; or a first value of the first parameter of the first logical channel includes the second value of the third parameter of the second logical channel. When the relationship between the first logical channel and the second logical does not exist, then the data of the first logical channel and the data of the second logical channel will/can be transmitted on different UL channels.

In some implementations, the wireless communication device (e.g., UE) will/can multiplex multiple UL elements to one uplink channel when the multiple UL elements belong to one UL element group. When multiple UL elements belong to different UL element groups, then the multiple UL elements will/can be transmitted through different UL channels. One serving cell group may include more than one UL element groups (groups of UL elements). The UL element may include at least one of data of a logical channel, a medium access control control element (MAC-CE), uplink control information (UCI), scheduling request (SR), a medium access control (MAC) entity, or a piece of information of MAC layer.

In some implementations, the first parameter may include a parameter of an uplink channel which includes a PUSCH, a PUCCH, or a transport channel.

In some implementation, the wireless communication device (e.g., UE) can transmit data of multiple logical channels on one UL channel when they are associated with same value of the first parameter (e.g., associated with, or intended for a same wireless communication node or TRP). Data of logical channels with different values of the first parameter (e.g. for different TRPs) will/can be transmitted through different UL channels. The UL channel can be transport channel or physical channel. When the multiple logical channels are transmitted on one UL channel, the multiple logical channels are multiplexed to one transport channel of MAC layer.

In some implementations, the first parameter comprises a parameter of a UL grant. In some implementation, the wireless communication node (e.g., gNB, or a second UE) can configure the value of the first parameter for a UL grant. For example, the wireless communication node (e.g., gNB, or a second UE) can configure the value of the first parameter for a type I configured UL grant.

In some implementation, the first parameter includes a fourth parameter and at least one of a serving cell index or the priority.

In some implementations, at least one of the first parameter, the second parameter, the third parameter, or the fourth parameter comprises at least one of: CORESET pool index, TRP index, PUSCH group index, PUCCH group index, an index, physical cell index (PCI), a combination of PCI and frequency parameter, logical channel group index, set index of a set of logical channel groups, Logical Channel index (LCID), the group index of the LCID, MAC entity, MAC entity index, UL element group, an index of an UL grant group, an index of an UL element, an index of a spatial relationship, an index of a spatial relationship group, an index of a TCI state group, or an index of an UL grant. The LCID may identify the logical channel instance of the corresponding MAC SDU or the type of the corresponding MAC CE or padding. If the first parameter comprises the logical channel group index, the logical channel in the logical channel group can be associated with the same logical channel group index (e.g., index/identifier of a group of logical channels). If the first parameter comprises a set index of a set of logical channel groups, the logical channel groups (groups of logical channels) in the set of logical channel groups can be associated with the same set index. The set index can be named to be an identification, or some other name. In some implementation, the first parameter is the frequency parameter of synchronization signal block (SSB) of the PCI. If the first parameter comprises a group index of LCIDs, the LCIDs can be divided to multiple LCID groups, each of which corresponds to one value of the first parameter. The data from logical channels with same LCID group index can be multiplexed to one channel. The data from logical channels with different LCID group indexes may be multiplexed or partitioned to different channels. The LCID group index can be obtained based on LCID and X, wherein the X is an integer and X represents maximal number of LCID in a LCID group. For example, the LCID group index may be equal to the quotient of LCID divided by X. If the first parameter comprises a MAC entity, one serving cell group may contain more than one MAC entities each of which corresponds to one MAC entity, or one MAC entity index.

In some implementations, one set of logical channel groups includes one or more logical channel groups. One logical channel group may include one or more logical channels. One logical channel group can correspond to one buffer state reporting (a reporting of buffer state information).

In some implementation, some type(s) of logical channel can be associated with some predetermined value(s) of the first parameter. For example, at least one of following logical channels can be associated with some predetermined value of the first parameter: Broadcast Control Channel, Paging Control Channel, Common Control Channel, Dedicated Control Channel, Sidelink Broadcast Control Channel, Sidelink Control Channel. These types of logical channel may not be associated with values of the first parameter other than the predefined value.

The wireless communication device (e.g., UE) may determine the value of the first parameter associated with one logical channel by using at least one of the following methods.

Method 1: the wireless communication node (e.g., gNB, or a second UE) may configure/determine the value of the first parameter for one logical channel. In some implementation, the wireless communication node may configure/determine the value of the first parameter, the priority and a serving cell list for one logical channel.

Figure 3:
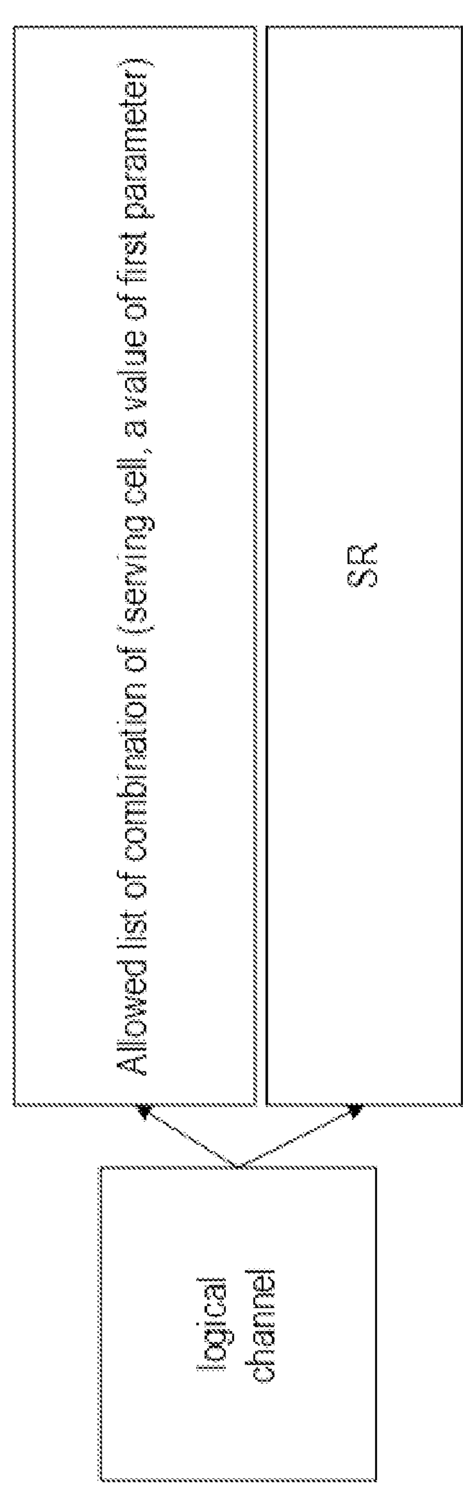
FIG. 3 illustrates an example of configuring or determining an allowed list of a combination of (an identification of) a serving cell and a value of the first parameter for one logical channel, in accordance with some embodiments of the present disclosure.
Figure 4:
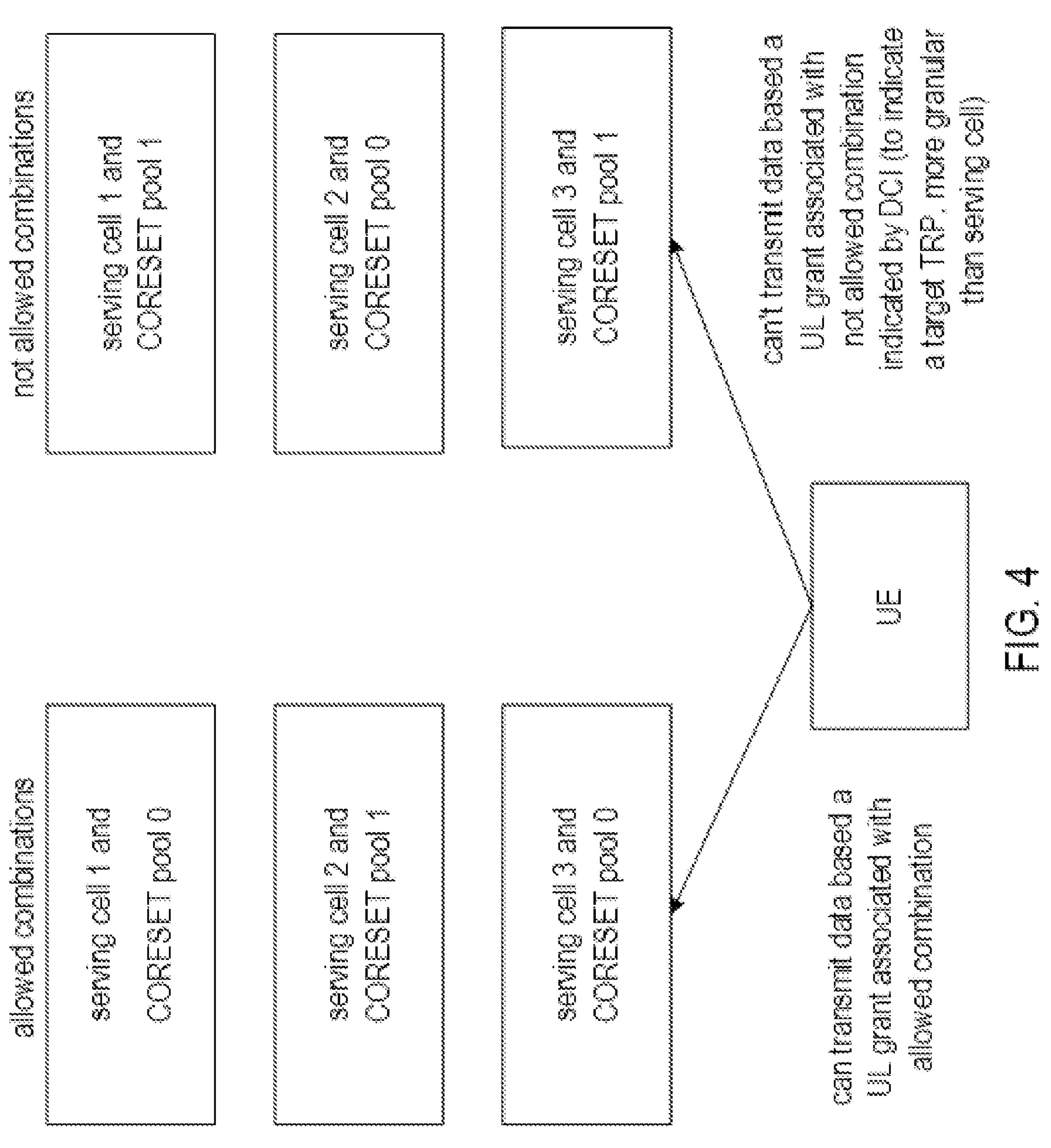
FIG. 4 illustrates an example of transmitting data of logical channel based on allowed combinations of a serving cell and a value of a first parameter for the logical channel, in accordance with some embodiments of the present disclosure.

Method 1-1: The wireless communication node (e.g., gNB, or a second UE) may configure/determine the allowed list of combinations which includes (an identification/indication of the) serving cell and a value of the first parameter for one logical channel as shown in FIG. 3. The gNB, or a second UE may configure/determine a value of first parameter for each serving cell in a serving cell list. Different serving cells in the serving cell list of one logical channel may correspond to different values of first parameter. The data of the logical channel can be transmitted based on an UL grant associated with the same value of the combination the serving cell and the first parameter as the logical channel. For example as shown in FIG. 4, the allowed combinations of serving cell and value of the first parameter for one logical channel may include serving cell 1 and CORESET pool index 0 and may not include serving cell 1 and CORESET pool index 1, and if a UL grant is associated with serving cell 1 and CORESET pool index 1, then the data of one logical channel may not be transmitted on a PUSCH/PUCCH scheduled by the UL grant. The UL grant associated serving cell 1 and CORESET pool index 1 may represent that the PUSCH/PUCCH scheduled by the UL grant is on serving cell 1 and the DCI informing the UL grant is in a CORESET with CORESET pool index 1, or type I configured UL grant is configured with CORESET pool index 1. Determining whether data of one logical channel can be transmitted on a PUSCH/PUCCH may be based on not only an allowed serving cell list (list of serving cells that are allowed) of the one logical channel but also allowed value of first parameter of the one logical channel. In some implementations, the value of first parameter of the logical channel comprises the value of first parameter of a SR associated with the logical channel. In some implementations, the value of combination of first parameter and serving cell of SR associated with the logical comprises the value of combination of first parameter and serving cell of the logical channel. In some implementation, the value of first parameter of SR associated with the logical comprises the value of first parameter of an allowed combination of the logical channel, wherein the serving cell of the combination includes the serving cell of the SR. For example, if the allowed combination of the logical channel includes {(serving cell 1, CORESET pool 0), (serving cell 2, CORESET pool 1), (serving cell 3, CORESET pool 0)} and the PUCCH resource of the SR is on serving cell 1, then the value of the first parameter of the SR comprises the CORESET pool 0 in the allowed combination of serving cell 1 and CORESET pool 0.

Figure 5:
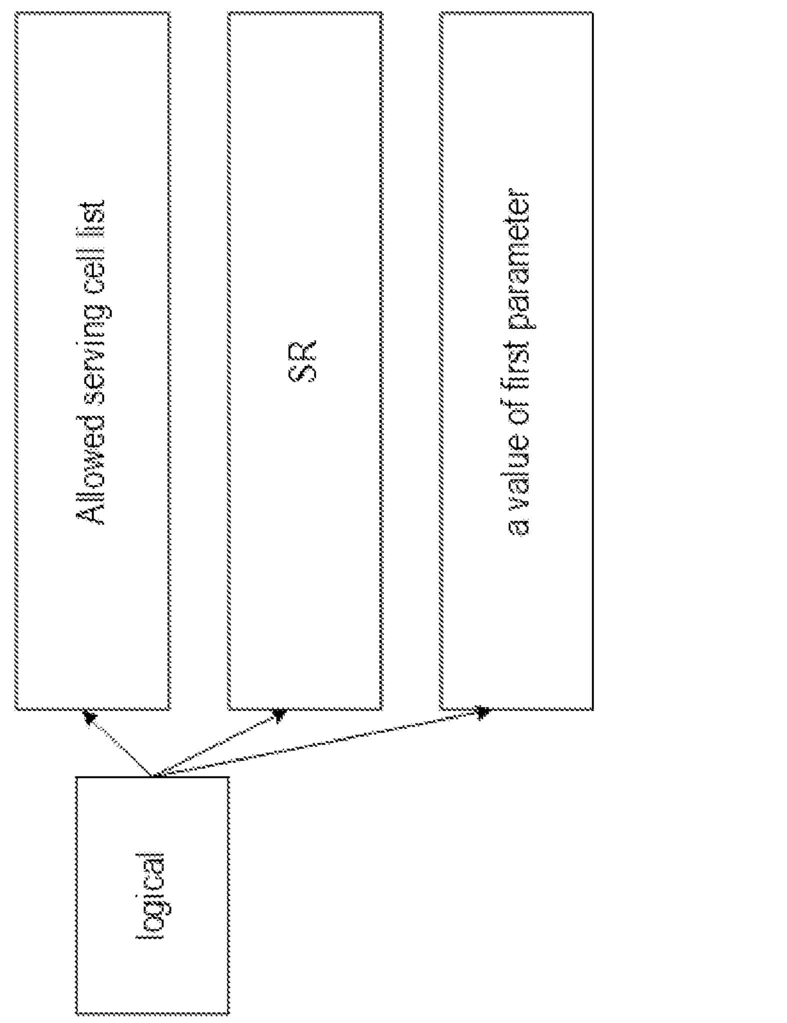
FIG. 5 illustrates an example of configuring or determining an allowed list of serving cells and values of a first parameter for one logical channel, where all allowed serving cells of the one logical channel may correspond to the same value of the first parameter, in accordance with some embodiments of the present disclosure.
Figure 6:
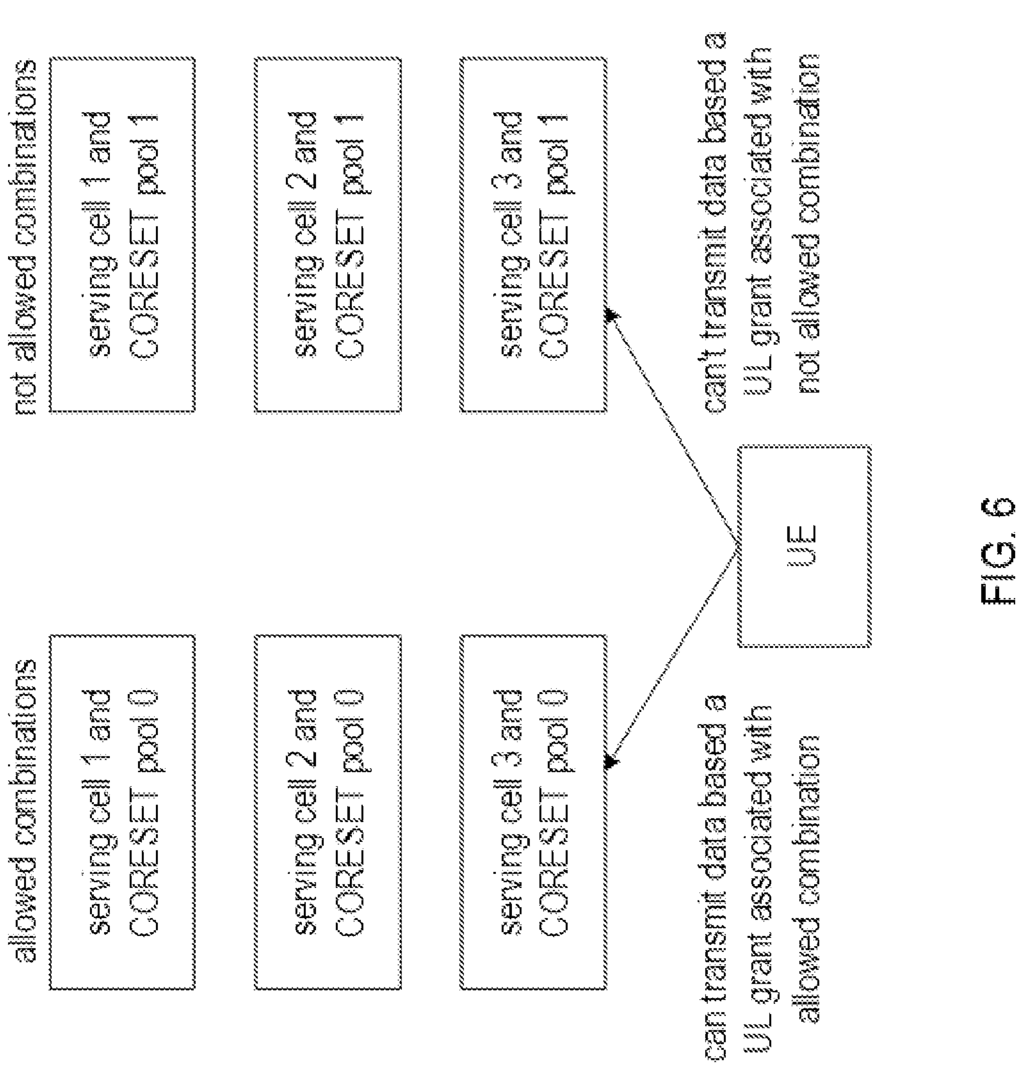
FIG. 6 illustrates an example of transmitting data of logical channel based on allowed combinations of a serving cell and a value of a first parameter for one logical channel, in accordance with some embodiments of the present disclosure.

Method 1-2: The wireless communication node (e.g., gNB, or a second UE) may configure/determine the allowed list of serving cells and values of the first parameter for one logical channel, and values of the first parameter may apply for all allowed serving cells of the one logical channel. For example, if the number of the values of the first parameter is one, then all allowed serving cells of the one logical channel may correspond to a same value of the first parameter as shown in FIG. 5 and FIG. 6.

Method 2: The wireless communication node (e.g., gNB, or a second UE) may configure the value of the first parameter for one logical channel group, and the value of the logical channels in the one logical channel group may include the value of the first parameter for the one logical channel group.

Method 3: The wireless communication node (e.g., gNB, or a second UE) may configure the value of the first parameter for one set of logical channel groups, and the value of the logical channels in the one set of logical channel groups may include the value of the first parameter for the one set of logical channel groups. One set of logical channel groups may include one or more logical channel groups.

Method 4: The wireless communication device (e.g., UE) can determine the value of one logical channel, and can report the value of the first parameter to wireless communication node (e.g., gNB, or a second UE). The value of the first parameter can be transmitted with data of the logical channel together. For example, a Logical Channel index (LCID) can be divided to multiple groups each of which may correspond to one value of the first parameter. The LCID may identify the logical channel instance of the corresponding MAC-SDU or the type of the corresponding MAC-CE or padding.

Method 5: The wireless communication node (e.g., gNB, or a second UE) can configure/fix the wireless communication device (e.g., UE) with a correspondence/relationship between LCID and a value of the first parameter. The value of the first parameter of one logical channel may include the value of the first parameter of the LCID of the logical channel.

Method 6: The wireless communication node (e.g., gNB, or a second UE) can configure/fix the wireless communication device (e.g., UE) with a correspondence/relationship between SR and a value of the first parameter. The value of the first parameter of one logical channel may include the value of the first parameter of the SR of the logical channel.

In some implementations, the value of first parameter of SR scheduling request associated with the logical comprises the value of first parameter of the logical channel. In some implementations, the value of first parameter of scheduling request (SR) associated with the logical channel and the value of first parameter of the logical channel may be the same. In some implementations, the value of first parameter of the logical channel may comprise the value of first parameter of scheduling request (SR) associated with the logical channel.

The SRs associated with a same value of the first parameter (e.g., associated with or destined for a same TRP) can be transmitted through one UL physical channel, such as PUSCH or PUCCH. The SRs associated with different values of the first parameter can be transmitted through different UL physical channel and they may not be transmitted through one UL physical channel. The SR can be transmitted based on a UL grant which is associated with same value of the first parameter as the SR. If the value of the first parameter of SR and the value of the second parameter of UL grant are different, then the SR may not be multiplexed (or mapped) on a physical UL channel scheduled by the UL grant.

In any method of the above methods of 1-3, the wireless communication node (e.g., gNB, or a second UE) can configure the value of the first parameter for each configuration unit, wherein the configuration unit may include one logical channel if method 1 is applied, one logical channel group if method 2 is applied, or one set of logical channel groups if method 3 is applied. In some implementations, if the wireless communication node (e.g., gNB, or a second UE) does not configure a configuration unit, then the value of the configuration unit can be a predefined value of the first parameter, or can be any value of the first parameter. For example, the wireless communication node (e.g., gNB, or a second UE) can configure the value of the first parameter for each logical channel in method 1 (or for each logical channel group in method 2, or for each set of logical channel groups in method 3) of a serving cell group which can be one of Master cell group (MCG), secondary cell group (SCG), primary PUCCH group, or secondary cell group. In some implementations, if the wireless communication node (e.g., gNB, or a second UE) does not configure the value of one logical channel (or of one logical channel group in method 2, or of one set of logical channel groups in method 3), the wireless communication device (e.g., UE) may assume that the value of the logical channel in method 1 (or of logical channels in the one logical channel group in method 2, or of logical channels in one set of logical channel groups in method 3) is a predetermined value of the first parameter. In some implementations, if the wireless communication node (e.g., gNB, or a second UE) does not configure the value of one logical channel in method 1 (or one logical channel group in method 2, or in one set of logical channel groups), the wireless communication device (e.g., UE) may assume that the value of the logical channel (or logical channels in the one logical channel group in method 2, or logical channels in one set of logical channel groups) is/includes all candidate values of the first parameter, e.g. any value of the first parameter.

In some implementations, the logical channel is a channel of a radio link control (RLC) layer. The data of a logical channel can be mapped to a transport channel of MAC layer to transmit.

In some implementations, one serving cell or one BWP is configured with more than one value of the first parameter.

In some implementations, one serving cell group includes more than one MAC entities each of which corresponds to one value of the first parameter. The serving cell group can be one of master cell group (MCG), secondary cell group (SCG), Primary PUCCH group, or secondary PUCCH group. Each MAC entity can perform independently and can be configured by MAC parameter respectively.

Accordingly, for one serving cell group/one serving cell/one BWP, the logical channel are divided to multiple sets. Data of multiple logical channels of one logical channel set can be transmitted/multiplexed on one UL channel, and data of multiple logical channels from different logical channel sets can be transmitted/multiplexed on different UL channels. The UE can transmit data of one logical channel based on a UL grant when the value of the first parameter of the logical channel includes the value of the second parameter of the UL grant. The UE may divide UL data to multiple sets, and different sets can be transmitted to different TRPs. The spectral efficiency and transmission robustness can be improved for UL data transmission. Accordingly, the UE can communicate with multiple TRPs. The multiple TRPs can schedule UE independently. Different UL channels including data of different logical channel sets can be transmitted by the UE simultaneously. Alternatively, different UL channels including data of logical channels with different values of the first parameter can be transmitted by the UE in different time resources or different frequency resources of one serving cell.

B. Second Example Implementation of Determining Value of First Parameter of MAC-CE and Transmitting MAC-CE Based on the Value of First Parameter Similarly as the first example, the wireless communication device (e.g., UE) and/or a wireless communication node (e.g., gNB, or a second UE) may determine a value of first parameter of a MAC-CE and transmit/multiplex the MAC-CE based on the value of first parameter as described in the first example, except the logical channel and data of logical channel in the first example is replaced with MAC-CE.

The value of the first parameter of MAC-CE can be obtained using the method in example 1. The wireless communication device (e.g., UE) may also determine the value of one MAC-CE by using at least one of the following methods.

Method 1: the wireless communication node (e.g., gNB, or a second UE) configures/determines/generates/fixes the value of the first parameter for one MAC-CE, or for one type of MAC-CE. For example, there can be two MAC-CEs for buffer state reporting. The first MAC-CEs for buffer state reporting may be configured (or determined, or fixed) with first value of the first parameter and the second MAC-CEs for buffer state reporting may be configured (or determined, or fixed) with second value of the first parameter. Similarly, there may be two beam failure recovery (BFR) MAC-CE, two cell radio network temporary identifier (C-RNTI) MAC-CE, two Configured Grant Confirmation, two Multiple Entry PHR for one MAC entity or for one cell group. Each of the MAC-CE may correspond to one value of the first parameter.

Figure 7:
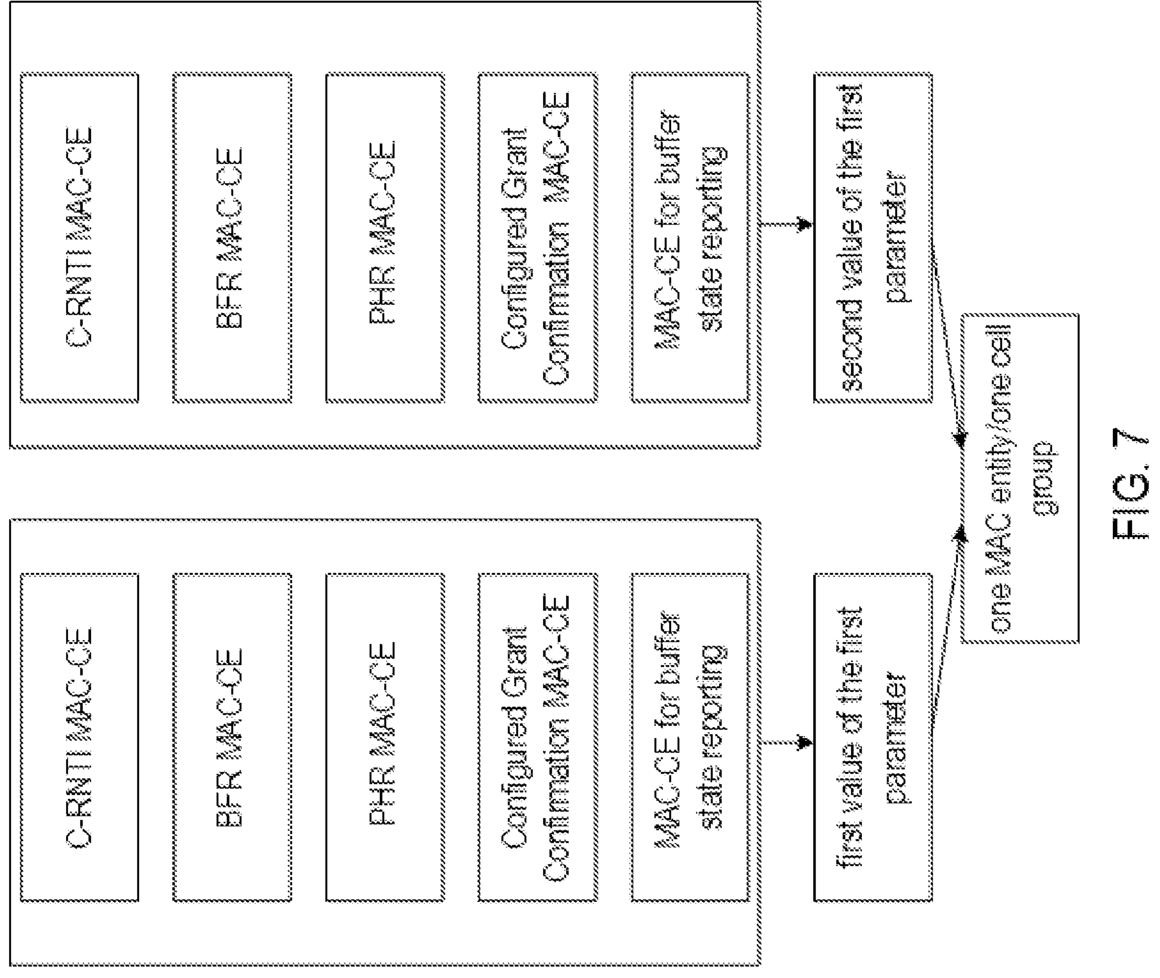
FIG. 7 illustrates an example of one serving cell group/one MAC entity corresponding to more than one sets of MAC-CEs, where each set of MAC-CE corresponds to a respect value of a first parameter and the more than one sets of MAC-CEs include a same type of MAC-CE, in accordance with some embodiments of the present disclosure.

Method 2: the wireless communication device (e.g., UE) may determine the value of the first parameter for one MAC-CE and can report the value of the first parameter for the one MAC-CE. For example, there may be two MAC-CEs for buffer state reporting each of which corresponds to one value of the first parameter. The Logical Channel index (LCID) of the two MAC-CEs for buffer state reporting may be different. The LCID may identify the logical channel instance of the corresponding MAC service data unit (SDU) or the type of the corresponding MAC CE or padding. The LCID also can be divided to multiple groups. As shown in FIG. 7, there can be two sets of MAC-CEs. Each set of MAC-CE may correspond to a respective value of the first parameter. Both of the two sets may include same type of MAC-CE. The multiple sets of MAC-CE may correspond to one MAC entity and/or one serving cell group. The one serving cell group can be one of MCG (Master cell group), SCG (secondary cell group), primary PUCCH group, secondary cell group. The same type of MAC-CE can also be one of C-RNTI MAC-CE, BFR MAC-CE, PHY MAC-CE, configured Grant confirmation MAC-CE, or MAC-CE for buffer state reporting. In one aspect, the same type of MAC-CE may be in both of the two sets of MAC-CE, but their LCIDs may be different.

Method 3: the wireless communication device (e.g., UE) may determine the value of first parameter of the MAC-CE according to the value of first parameter of SR or logical channel corresponding to the MAC-CE.

Method 4: the wireless communication node (e.g., gNB, or a second UE)/wireless communication device (e.g., UE) can configure/fix the correspondence between LCID and value of the first parameter.

C. Third Example Implementation of Determining Value of First Parameter of UCI and Transmitting UCI Based on the Value of First Parameter Similarly as the first example or the second example, the wireless communication device (e.g., UE) and/or wireless communication node (e.g., gNB, or a second UE) may determine a value of first parameter of an uplink control information (UCI) and transmit/multiplex UCI according to the value of the first parameter as described in the first example by replacing logical channel and data of logical channel in the first example with UCI, or as described in the second example by replacing MAC-CE in the second example 2 with UCI.

The value of the first parameter of UCI can be obtained using method in the first example or the second example. It also can be obtained by following method.

If the UCI includes CSI (channel state information), the wireless communication node (e.g., gNB, or a second UE) can configure a value of the first parameter of a CSI reporting. The wireless communication node (e.g., gNB, or a second UE) also can configure a value of the first parameter of a CSI reporting or for a CSI reporting group.

If the UCI includes HARQ-ACK for a downlink channel, then the value of the first parameter of the HARQ-ACK may comprise the value of the first parameter of the downlink channel. The downlink channel may include at least one of PDSCH, or PDCCH.

D. Fourth Example Implementation of Determining Value of First Parameter of Scheduling Request SR and Transmitting SR Based on the Value of First Parameter Similarly as the first example or the second example, the wireless communication device (e.g., UE) and/or wireless communication node (e.g., gNB, or a second UE) may determine a value of first parameter of a SR and transmit/multiplex the SR based on the value of the first parameter, as described in the first example except the logical channel and data of logical channel in first example can be replaced with SR, or as described in the second example except MAC-CE in the second example can be replaced with SR.

E. Fifth Example Implementation of Determining Value of First Parameter of UL Element and Transmitting UL Element Based on the Value of First Parameter Similarly as the first example or the second example, the wireless communication device (e.g., UE) and/or wireless communication node (e.g., gNB, or a second UE) may determine a value of first parameter of a UL element, and transmit/multiplex UL element based on the value of first parameter as described in the first example except the logical channel in first example can be replaced with the UL element, or as described in the second example except MAC-CE in the second example can be with the UL element.

For example, at least two of: data of logical channel, MAC-CE, UCI, or SR can be multiplexed when they are associated with the same value of the first parameter.

When any two of data of logical channel, MAC-CE, UCI, or SR are associated with different values of the first parameter, they may not be multiplexed.

The multiplexed information can be mapped to one transport channel of MAC layer. Alternatively, the multiplexed information can be mapped to one physical channel. The physical channel may include UL physical channel such as PUSCH, or PUSCH.

Figure 8:
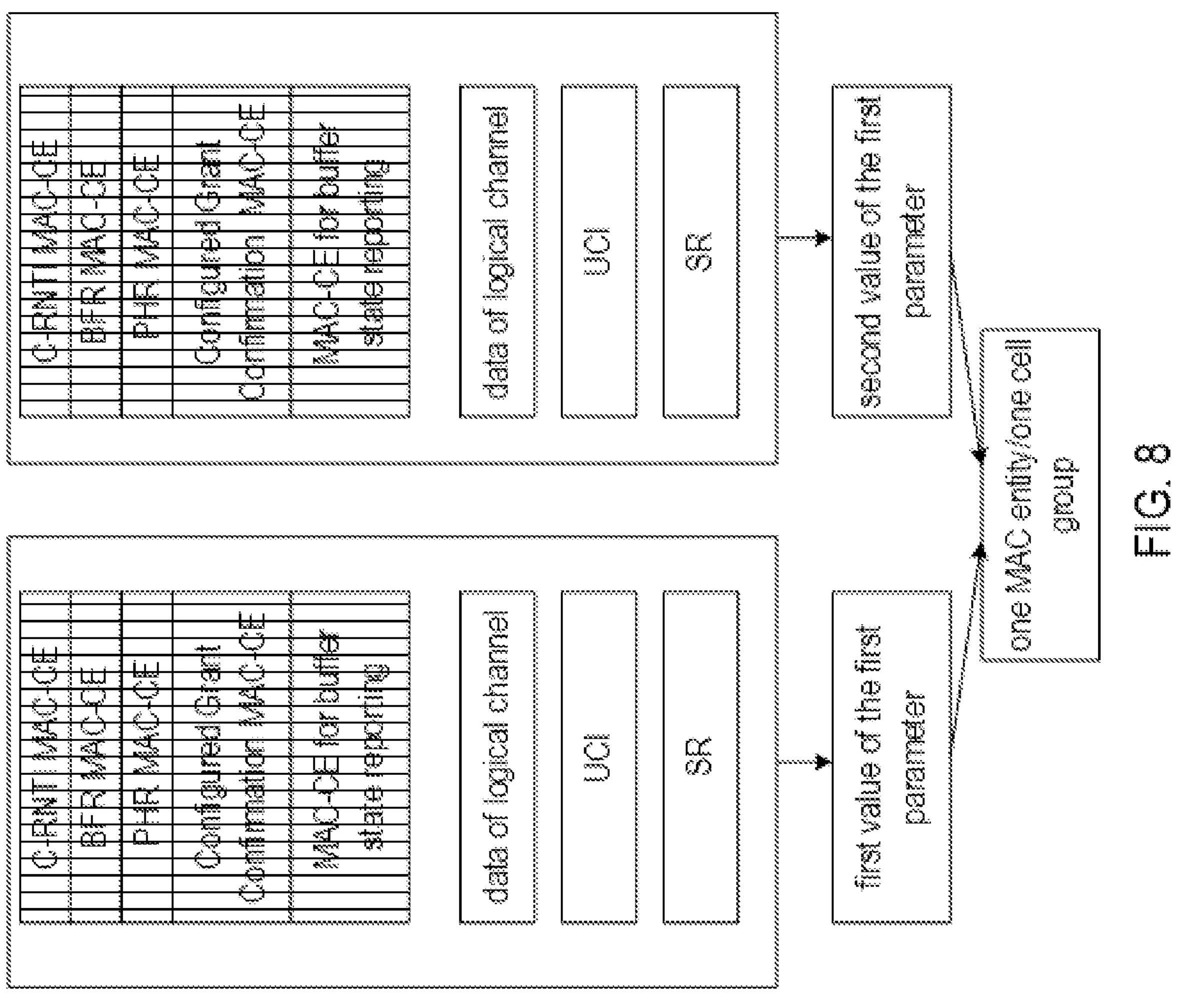
FIG. 8 illustrates an example of one serving cell group/one MAC entity corresponding to more than one sets of UL elements, where each set of UL element corresponds to a respect value of a first parameter, in accordance with some embodiments of the present disclosure.

One serving cell group/MAC-entity can correspond to more than one set of UL elements as shown in FIG. 8. Each set of UL element may correspond to a value of first parameter.

In some implementation, the UL element comprises at least one: data of logical channel, MAC-CE, UCI, SR, a piece of information of MAC layer.

F. Sixth Example Implementation of Determining Value of First Parameter of a Piece of Information and Transmitting the Piece of Information Based on the Value of First Parameter In some implementations, the wireless communication device (e.g., UE) will/can multiplex multiple pieces of information to one MAC-CE when the multiple pieces of information are associated with same value of the first parameter. When the multiple pieces of information are associated with different values of the first parameter, then the multiple pieces of information will/can be transmitted by different UL channels and the multiple pieces of information will/can be multiplexed to different MAC-CEs. One serving cell group/serving cell/BWP may include more than one MAC-CE of same type.

Figure 9:
FIG. 9 illustrates an example of multiplex entries of information can be multiplexed to one MAC-CE and one channel when the multiplex entries are associated with same value of first parameter, in accordance with some embodiments of the present disclosure.

In some implementation, one piece of information includes one entry of information of one MAC-CE. For example, a buffer size reporting MAC-CE as shown in FIG. 9 includes multiple entries of buffer size reporting. Each entry may include logical channel group index $LCG_i$ and buffer size reporting of the logical channel group $LCG_i$. Multiple entries can be in one MAC-CE when the multiple entries are associated with same value of the first parameter. The value of first parameter of the one entry may include a value of first parameter of a logical channel group whose buffer size is reported in the entry. When multiple entries are associated with different values of the first parameter, the multiple entries can be transmitted on different UL channels/MAC-CEs.

In some implementations, the first parameter comprises at least one of: CORESET pool index, TRP index, PUSCH group index, PUCCH group index, an index, physical cell index (PCI), a combination of PCI and frequency parameter, logical channel group index, set index of a set of logical channel groups, Logical Channel index (LCID), the group index of the LCID, MAC entity, MAC entity index, UL element group, an index of an UL grant group, an index of an UL element, an index of a spatial relationship, an index of a spatial relationship group, an index of a TCI state group, or an index of an UL grant. The LCID may identify the logical channel instance of the corresponding MAC SDU or the type of the corresponding MAC CE or padding. If the first parameter comprises the logical channel group index, the logical channel in the logical channel group can be associated with the same logical channel group index (e.g., index/identifier of a group of logical channels). If the first parameter comprises a set index of a set of logical channel groups, the logical channel groups (groups of logical channels) in the set of logical channel groups can be associated with the same set index. The set index can be named to be an identification, or some other name. In some implementation, the first parameter is the frequency parameter of synchronization signal block (SSB) of the PCI. If the first parameter comprises a group index of LCIDs, the LCIDs can be divided to multiple LCID groups, each of which corresponds to one value of the first parameter. The data from logical channels with same LCID group index can be multiplexed for transmission through one channel. The data from logical channels with different LCID group indexes may be multiplexed or partitioned to different channels. The LCID group index can be obtained based on LCID and X, wherein the X is an integer and X represents maximal number of LCID in a LCID group. For example, the LCID group index may be equal to the quotient of LCID divided by X. If the first parameter comprises a MAC entity, one serving cell group may contain more than one MAC entities each of which corresponds to one MAC entity, or one MAC entity index.

G. Seventh Example Implementation of Select UL Element for a UL, Grant Among UL Elements with Same Value of First Parameter In some implementations, the priority of UL element is among UL elements with same value of first parameter. The UL element may include at least one of: data of logical channel, MAC-CE, UCI, or SR.

The wireless communication device (e.g., UE) selects UL element among UL elements according to the priority.

The priority may include at least one of a first priority or a second priority. The first priority is a physical priority. The UL element can be transmitted based on a UL grant when the value of the first parameter of the UL element includes the value of a second parameter of the UL grant and the value of the first priority of the UL element includes the value of the first priority of the UL grant. The first priority of the UL grant may be included in the UL grant when the UL grant is a dynamical UL grant. In some implementation, one UL channel scheduled by one UL grant includes data of multiple UL elements which are with same value of first priority and with same value of first parameter.

After selecting UL elements for a UL grant according to the first priority and the first parameter, then the wireless communication device can further select the selected UL element for the UL grant based on the second priority. In some implementation, one UL channel scheduled by one UL grant can include data of multiple UL elements which are with same or different values of second priority and with same value of first parameter.

In some implementation, the first parameter includes a fourth parameter and at least one of a serving cell index or the priority.

In some implementations, at least one of the first parameter, the second parameter, or the fourth parameter comprises at least one of: CORESET pool index, TRP index, PUSCH group index, PUCCH group index, an index, physical cell index (PCI), a combination of PCI and frequency parameter, logical channel group index, set index of a set of logical channel groups, Logical Channel index (LCID), the group index of the LCID, MAC entity, MAC entity index, UL element group, an index of an UL grant group, an index of an UL element, an index of a spatial relationship, an index of a spatial relationship group, an index of a TCI state group, or an index of an UL grant.

Figure 10:
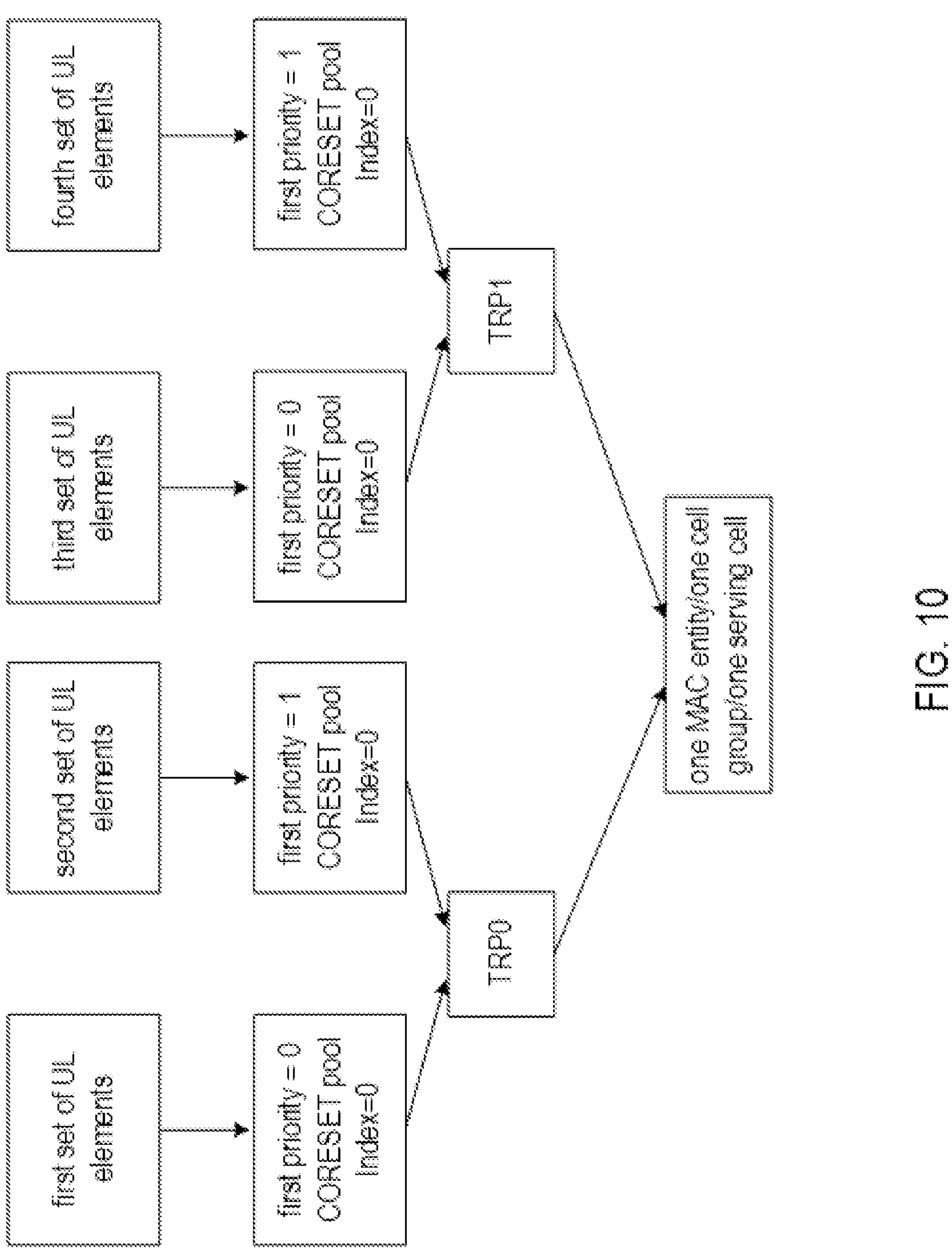
FIG. 10 illustrates an example of one serving cell group/one MAC entity/one serving cell corresponding to four sets of UL elements, where each of the four UL elements corresponds to a respect value of a first parameter and a respect value of a first priority, in accordance with some embodiments of the present disclosure.

In some implementation, one serving cell group/one MAC entity/one serving cell/one BWP may correspond to four sets of UL element as shown in FIG. 10. Each of the four sets may correspond to one value of the first priority and one value of the first parameter (such as CORESET pool index). For example, one value of the first priority may correspond to one type of service, such as enhanced mobile broadband (eMBB), or ultra reliable low latency communication (URLLC). One value of the first parameter may correspond to one TRP.

Accordingly, UL elements for one TRP can be selected according to priority. Accordingly, by any of first example to seventh example, for one serving cell group/one serving cell/one BWP, the UL element can be divided to multiple sets. Multiple UL elements of one UL element set can be transmitted/multiplexed on one UL channel, and multiple UL elements from different UL element sets can be transmitted/multiplexed on different UL channels. The UE can transmit one UL element based on a UL grant when the value of the first parameter of the UL element includes the value of the second parameter of the UL grant. The UE may divide UL element to multiple sets, and different sets can be transmitted to different TRPs. The spectral efficiency and transmission robustness can be improved for UL element transmission. Hence, the UE can communicate with multiple TRPs. The multiple TRP can each schedule one UE independently. Different UL channels including UL elements with different values of the first parameter (or from different UL element sets) can be transmitted by the UE simultaneously. Alternatively, different UL channels including UL elements with different values of the first parameter (or from different UL element sets) can be transmitted by the UE in different time resources or different frequency resources of one serving cell.

H. Eighth Example Implementation of Reporting SSB-RI Based on Multiple Sets

When one CSI reporting includes multiple sets for channel measurement. Each of the multiple sets may include SSB resources of one PCI. The wireless communication device (e.g., UE) may report SSB resource indicator (RI) based on the multiple sets for channel measurement. The SSB-RI may be based on SSB resource index of one set of the multiple sets and set index of the multiple sets. For example, the multiple sets include set 0 of PCI k and set 1 of PCI m. For example, the set 0 includes {SSB resource 1 of PCI k, SSB resource 8 of PCI k, SSB resource 16 of PCI k, SSB resource 17 of PCI k}, and the set 1 includes {SSB resource 3 of PCI m, SSB resource 12 of PCI m, SSB resource 26 of PCI m, SSB resource 18 of PCI m}. Then the SSB-RI of 0~3 may correspond to {SSB resource 1 of PCI k, SSB resource 8 of PCI k, SSB resource 16 of PCI k, SSB resource 17 of PCI k} of set 0 in that order and the SSB-RI of 4~7 may correspond to {SSB resource 3 of PCI m, SSB resource 12 of PCI m, SSB resource 26 of PCI m, SSB resource 18 of PCI m} of set 1 in that order. Resources of the multiple sets can be first indexed in an ascending order across resources indexes in a same set and then can be indexed in an ascending order across the multiple sets.

Accordingly, the UE can select beam corresponding to one SSB resource across multiple sets.

I. Ninth Example Implementation of Configuring Sequence Parameter for Each PCI

For a serving cell, a wireless communication node (e.g., gNB, or a second UE or a second UE) can configure a wireless communication device (e.g., a first UE) with multiple physical cell indexes (PCIs) for one serving cell.

For each PCI of the multiple PCIs, the wireless communication node can configure the wireless communication device with one set of scrambling ID. When the PCI of a channel changes, the set of scrambling ID may be one set of scrambling ID corresponding to the PCI. For example, the set of scrambling ID may include two scrambling IDs of demodulation reference signal (DMRS). When PCI of a channel changes, the set of two scrambling IDs of DMRS may change to the set of two scrambling IDs of DMRS corresponding to the PCI of the channel. Which of the two scrambling ID of DMRS should be used to generate sequence of DMRS of the channel may depend on indication in DCI scheduling the channel.

In some implementations, for each PCI of the multiple PCIs, the wireless communication node can configure the wireless communication device with one set of scrambling ID for each BWP of the serving cell. When the PCI of a channel changes and/or BWP changes, the set of scrambling ID may be changed to the set one set of scrambling ID corresponding to the PCI and the BWP.

In some implementations, one set of scrambling ID includes seven scrambling IDs which comprises two scrambling ID of uplink DMRS, two scrambling ID of downlink DMRS, one scrambling ID of uplink channel to generate scrambling sequence of the uplink channel, and two scrambling ID of downlink channel to generate scrambling sequence of the downlink channel.

In some implementations, if one set of scrambling ID includes two scrambling IDs, then the two scrambling IDs may be used as two scrambling ID of DMRS for both uplink and downlink. The two scrambling IDs may be used as two scrambling ID of scrambling sequence of for both uplink channel and downlink channel. Alternatively, the first of the two scrambling IDs may be used as scrambling ID of scrambling sequence for uplink channel.

J. Tenth Example Implementation of Configuring Flag Indicating QCL-RS of One CSI-RS Resource Following the Unified TCI State A trigger state of a CSI request in a DCI is associated with one or more associated report configuration which is configured by RRC signaling. For one associated report configuration, a RRC signaling from the wireless communication nodes includes set selection, bitmap and TCI state indication list. Each bit of the bitmap indicates the TCI state of one CSI-RS resource follows unified TCI state. Alternatively, each bit of the first Y bits of the bitmap indicates the TCI state of one CSI-RS resource follows unified TCI state. The Y may be equal to the number of CSI-RS resource in the selected CSI-RS resource set. The number of bits in the bitmap can be maximal number of CSI-RS resource in one CSI-RS resource set. The number of the TCI state indication in TCI state indication list may be equal to the number of bit with value 0 in the bitmap or in the first Y bits, wherein a bit with value 0 indicate that the TCI state of the CSI-RS resource corresponding to the bit does not follow the unified TCI state and needs to be configured by the RRC signaling. Alternatively, the number of the TCI state indication in TCI state indication list may be equal to the number of bit with value 1 in the bitmap or in the first Y bits, wherein a bit with value 1 indicate that the TCI state of the CSI-RS resource corresponding to the bit does not follow the unified TCI state and may be configured by the RRC signaling.

K. Eleventh Example Implementation of Determining Monitoring Occasion for CSS

When a CORESET is configured with more than one transmission configuration indication (TCI) state and is associated with a common search space (CSS), the wireless communication device may determine the monitoring occasion of the CSS based on each of the more than one TCI state. Alternatively, the more than one TCI states for the one CORESET may be quasi-locationed (QCLed) with same SSB index. The wireless communication device may determine the monitoring occasion of the CSS based on the same SSB index of the more than one TCI state.

For example, there is a relationship between multiple SSBs (synchronization signal/physical broadcast channel block) and multiple sets of monitoring occasion of the CSS. A set of monitoring occasion can be obtained based on SSB index among the multiple SSBs. Then when the CORESET associated with the CSS is configured with more than one TCI state, Each of the more than one TCI state may include reference signal which is QCL (quasi-lo-cation)-ed with a SSB. The wireless communication device may determine the monitoring occasion of the CSS based on each SSB corresponding to each of the more than one TCI state. For example, the CORESET may be configured with {TCI state 0, TCI state 1}. TCI state 0 may include CSI-RS 0 which is QCL-ed with SSB 0 and TCI state 1 may include CSI-RS 1 which is QCL-ed with SSB 1. The wireless communication device may determine the monitoring occasion of the CSS. The monitor occasion may include two sets of monitoring occasion. The UE may monitor PDCCH candidate of the CSS in the two sets of monitoring occasion. The first of the two sets of monitoring occasions may be determined based on SSB0 associated with TCI state 0 and the corresponding relationship between multiple SSBs and multiple sets of monitoring occasion of the CSS. The second of the two sets of monitoring occasions may be determined based on SSB1 associated with TCI state 1 and the corresponding relationship between multiple SSBs and multiple sets of monitoring occasion of the CSS. In some implementation, the wireless communication device may determine QCL-RS for the CORESET (and/or for the CSS) based on the two TCI states in each of the two sets of monitoring occasion. In second implementation, the wireless communication device may determine QCL-RS for the CORESET (and/or for the CSS) based on the first of the two TCI states in the first of the two sets of monitoring occasion. The wireless communication device may determine QCL-RS for the CORESET (and/or for the CSS) based on the second of the two TCI states in the second of the two sets of monitoring occasion.

In another implementation, the more than one TCI state of the CORESET are QCL-ed with a same SSB index, the UE may determine one set of monitoring occasion of the CSS based on the same SSB index. For example, the CORESET may be configured with {TCI state 0, TCI state 1}. TCI state 0 may include CSI-RS 0 which is QCL-ed with SSB 0 and TCI state 1 may include CSI-RS 1 which is QCL-ed with SSB 0. The wireless communication device may determine the monitoring occasion of the CSS including one set of monitoring occasion based on SSB0 and the corresponding relationship between multiple SSBs and multiple sets of monitoring occasion of the CSS. The UE may monitor PDCCH candidate of the CSS in the one set of monitoring occasion.

In some implementation, the CORESET includes CORESET 0. The CSS may include at least of type 0 CSS, type 0A CSS, or type 2 CSS. The corresponding relationship between multiple SSBs (synchronization signal/physical broadcast channel block) and multiple monitoring occasion of the CSS may be same as relationship between multiple SSBs and multiple monitoring occasion of the CSS 0.

Figure 11:
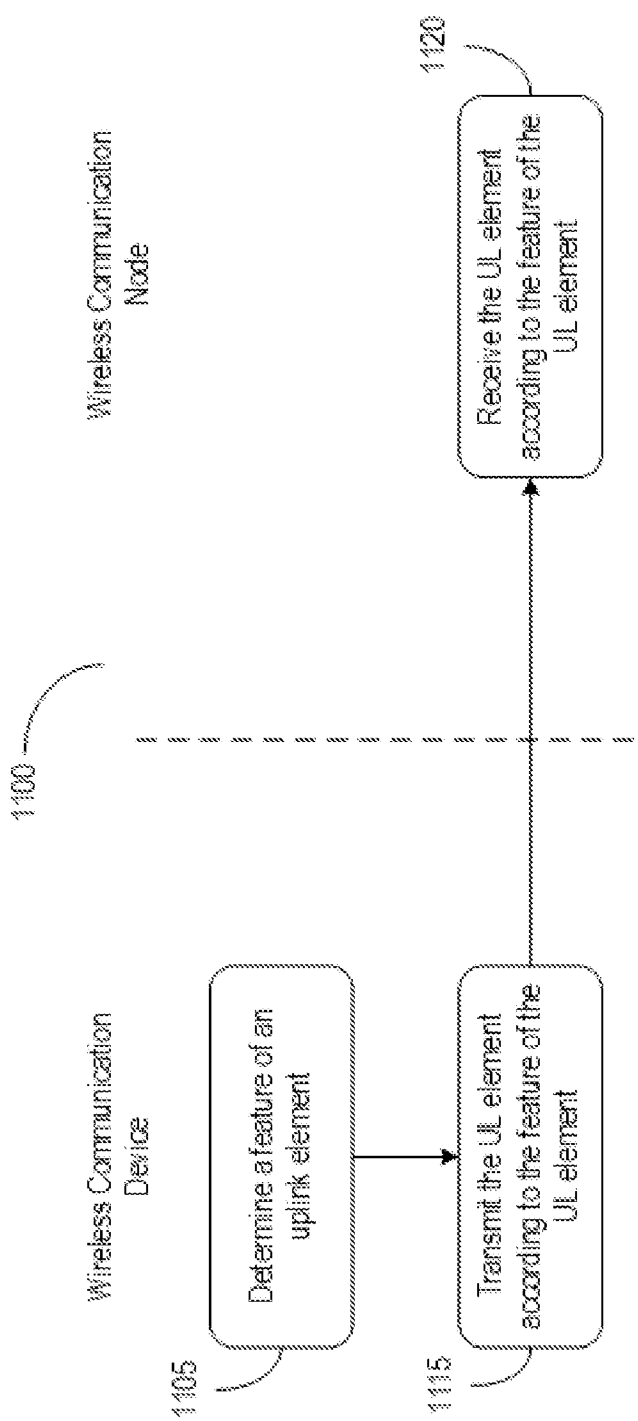
FIG. 11 illustrates a flow diagram of an example method for configuring communication between a wireless communication device and one or more wireless communication nodes, in accordance with an embodiment of the present disclosure.

L. Process for Configuring Communication Between Wireless Communication Device and One or More Wireless Communication Nodes Referring now to FIG. 11, depicted is a method 1100 for configuring communication between a wireless communication device and one or more wireless communication nodes, in accordance with an embodiment of the present disclosure. The method 1100 may be implemented using or performed by any of the components detailed above, such as the UE 104 or 204 and BS 102 or 202, or TRPs. In brief overview, a wireless communication device (e.g., UE) may determine a feature of an uplink element (1105). The wireless communication device may transmit the UL element according to the feature of the UL element (1115). The wireless communication node (e.g., base station or TRP) may receive the UL element according to the feature of the UL element (1120).

In further detail, the wireless communication device (e.g., UE) may determine a feature of an uplink element (1105). In one aspect, a wireless communication device can determine a feature of an uplink (UL) element. The UL element may include at least one of: data of a logical channel, a medium access control-control element (MAC-CE), uplink control information (UCI), scheduling request (SR), a medium access control (MAC) entity, or a piece of information. The UL elements may be identified as being directed to the same TRP.

The feature of the UL element may include at least one of: a value of the first parameter of the UL element, a value of a second parameter of an UL grant, a relationship between the UL element and the UL grant, or a relationship between the value of the first parameter of the UL element and the value of the second parameter of the UL grant. The UL grant may include at least one of: a dynamically configured UL grant, a type I configured UL grant, or a type II configured UL grant. The wireless communication device can determine, according a received signaling, a value of a second parameter for an UL grant.

In one aspect, the UL element is associated with one or more values of a first parameter. The first parameter may include a fourth parameter and at least one of a serving cell index or an a value of a priority. The priority may include a first priority and a second priority. An UL channel, that corresponds to the UL grant, may include UL elements with a same value of the first priority and with a same value of the first parameter. The UL channel, that corresponds to the UL grant, may include UL elements with a same or different value of the second priority and with a same value of the first parameter. In one aspect, at least one of the first parameter, the second parameter, the third parameter, or the fourth parameter includes at least one of: a parameter of an uplink channel; a parameter of an UL grant; a control resource set (CORESET) pool index; a transmission-reception point (TRP) index; an index of a PUSCH group; an index of a PUCCH group, a physical cell index (PCI); a combination of the PCI and a frequency parameter; an index of a logical channel group index; a set index of a set of logical channel groups; a medium access control (MAC) entity (e.g. a MAC later/level resource management entity); an index of the MAC entity, an index of an UL grant group; an index of an UL element; an index of a spatial relationship; an index of a spatial relationship group; an index of an UL grant; or an index of a transmission configuration indicator (TCI) state group. In one aspect, the UL element is selected for a UL grant according to a priority of the UL element among UL elements having a same value of the first parameter. In one aspect, if the UL element is of a defined type, the UL element can be associated with a predetermined value of the first parameter. The defined type may include a common/shared UL element.

In one aspect, at least one of a serving cell, a bandwidth part (BWP) or a serving cell group includes more than one UL element set. Each of the more than one UL element set may correspond to a respective value of a first parameter. One serving cell group may correspond to more than one medium access control (MAC) entities. In one aspect, two or more parameters of the more than one MAC entities have a same value. At least one MAC entity parameter is configured to each of the more than one MAC entities independently. A fifth parameter of a first MAC entity and a fifth parameter of a second MAC entity may have the same value. The first MAC entity and the second MAC entity may be from more than one MAC entities of the one serving cell group.

In one aspect, at least one of: the first parameter and the second parameter are of a same type of parameter; the relationship between the UL element and the UL grant includes an associated relationship between the UL element and the UL grant; or the relationship between the value of the first parameter of the UL element and the value of the second parameter of the UL grant comprises that: the value of the first parameter of the UL element includes the value of the second parameter of the UL grant; or the relationship between the value of the first parameter of the UL element and the value of the second parameter of the UL grant comprises that: the value of the first parameter of the UL element and the value of the second parameter of the UL grant are same.

In one aspect, the first wireless communication device may determine a value of a first parameter of an UL element according to at least one of: a rule, a signaling received from a wireless communication node, or a reporting transmitted by the first wireless communication device. The signaling may include at least one of: the value of the first parameter for a serving cell of the UL element; the value of the first parameter of the UL element; the value of the first parameter for an UL element group which includes the UL element; or the value of the first parameter for an UL element set which includes one or more groups, where at least one of the one or more groups includes the UL element. When determining the value of the first parameter of the UL element according to the rule, the value of the first parameter of the UL element may comprise at least one of: an index of the UL element, an index of an UL element group which includes the UL element, or an index of an UL element set which includes one or more groups, where at least one of the one or more groups includes the UL element. In one aspect, the value of the first parameter of the UL element applies for all serving cells in a serving cell list of the UL element. In some embodiments, each serving cell in the serving cell list of the UL element corresponds to a respective value of the first parameter. In one aspect, the value of the first parameter of the UL element comprises a value of the first parameter of a scheduling request of the UL element. In one aspect, one UL element group may correspond to one entry of a buffer size reporting.

In one aspect, the first wireless communication device can transmit the UL element according to the feature of the UL element (1115). In one aspect, the first wireless communication device can transmit the UL element according to the UL grant, when the value of the first parameter of the UL element includes the value of the second parameter of the UL grant. In one aspect, the first wireless communication device can transmit the UL element according to the UL grant, when the relationship between the value of the first parameter and the value of second parameter of the UL grant exists. In one aspect, the first wireless communication device can transmit the UL element according to the UL grant, when the relationship between the UL element and an UL grant exists.

In one aspect, the first wireless communication device can transmit the UL element based on an UL grant regardless of a value of a first parameter of the UL element, if the UL element is not configured with the value of the first parameter. In one aspect, if the UL element is not configured with a value of a first parameter, the first parameter of the UL element includes all candidate values of the first parameter, such that the first wireless communication device can transmit the UL element based on the UL grant regardless of a value of a first parameter.

In one aspect, when multiple UL elements are associated with a same value of a first parameter, the multiple UL elements can be multiplexed for transmission through one channel, or can be multiplexed to one medium access control control element (MAC-CE). The one channel or the one MAC-CE may be associated with a value of a second parameter, and the same value of the first parameter may correspond to the value of the second parameter. When a relationship between a first UL element and a second UL element exists, the first UL element and the second UL element can be multiplexed for transmission through one channel, or can be multiplexed to one MAC-CE. In one aspect, when the relationship between the first UL element and the second UL element comprises at least one of: a relationship between the first UL element and the second UL element; a relationship between a first value of a first parameter of the first UL element and a second value of a third parameter of the second UL element; or that a first value of the first parameter of the first UL element includes the second value of the third parameter of the second UL element. In one aspect, the one channel comprises a least one of: a transport channel or a physical channel.

The wireless communication node (e.g., base station or TRP) may receive the UL element according to the feature of the UL element (1120). For example, the wireless communication node may decode the UL element and communicate with the wireless communication device based on the received UL element. For example, the wireless communication node may transmit UL grant scheduling DCI to the wireless communication device if the UL element is a SR or MAC-CE. For another example, the wireless communication node may allocate downlink resource for the wireless communication device based on the UL element which includes UCI.

Accordingly, for one serving cell group/one serving cell/one BWP, the UL element can be divided to multiple sets. Multiple UL elements of one UL element set can be transmitted/multiplexed on one UL channel, and multiple UL elements from different UL element sets may be transmitted/multiplexed on different UL channels. The UE can transmit one UL element based on a UL grant when the value of the first parameter of the UL element includes the value of the second parameter of the UL grant. The UE may divide UL elements to multiple sets, and different sets can be transmitted to different TRPs. The spectral efficiency and transmission robustness can be improved for UL element transmission. Hence, the UE can communicate with multiple TRPs. The multiple TRP can schedule one UE independently. Different UL channels including UL elements with different values of the first parameter (or from different UL element sets) can be transmitted by the UE simultaneously. Alternatively, different UL channels including UL elements with different values of the first parameter (or from different UL element sets) can be transmitted by the UE in different time resources or different frequency resources of one serving cell. The multiple UL element sets can corresponds to multiple MAC entities or one MAC entity. When the multiple UL element sets can corresponds to multiple MAC entities, each of the multiple MAC entities corresponds to one UL element set of the multiple UL element sets and can be configured with parameter of MAC entity independently. Some parameter across the multiple MAC entities can be limited to satisfy some restriction, for example, they should be same, or they should be in some allowed combination.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media (or any non-transitory computer readable medium) that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

determining, by a first wireless communication device, a feature of an uplink (UL) element;

transmitting, by the first wireless communication device, the UL element according to the feature of the UL element, wherein the feature of the UL element comprises a relationship between a value of a first parameter of the UL element and a value of a second parameter of a UL grant, wherein the UL element is associated with one or more values of the first parameter, wherein the relationship between the value of the first parameter of the UL element and the value of the second parameter of the UL grant comprises that the value of the first parameter of the UL element includes the value of the second parameter of the UL grant, the first parameter of the UL element comprising at least one of: an index of the UL element or an index of an UL element group which includes the UL element; and transmitting, by the first wireless communication device, the UL element according to the UL grant when the value of the first parameter of the UL element includes the value of the second parameter of the UL grant.

2. The method of claim 1, wherein the first parameter and the second parameter satisfy at least one of following features:

the first parameter and the second parameter are of a same type of parameter;

the relationship between the UL element and the UL grant comprises an associated relationship between the UL element and the UL grant; or the relationship between the value of the first parameter of the UL element and the value of the second parameter of the UL grant comprises that: the value of the first parameter of the UL element and the value of the second parameter of the UL grant are same.

3. The method of claim 1, comprising:

transmitting, by the first wireless communication device, the UL element based on the UL grant regardless of the value of the first parameter, when the UL element is not configured with the value of the first parameter, or when the UL element is not configured with the value of the first parameter, the first parameter of the UL element includes all candidate values of the first parameter.

4. The method of claim 1, wherein when multiple UL elements are associated with a same value of the first parameter, the multiple UL elements are multiplexed for transmission through one channel, or are multiplexed to one medium access control control element (MAC-CE).

5. The method of claim 4, wherein the one channel or the one MAC-CE is associated with the value of the second parameter, wherein the same value of the first parameter corresponds to the value of the second parameter and the one channel comprises at least one of: a transport channel or a physical channel.

6. The method of claim 1, wherein when the UL element is of a defined type, the UL element can only be associated with a predetermined value of the first parameter, wherein the defined type comprises a common UL element.

7. The method of claim 1, comprising:

determining, by the first wireless communication device, the value of the first parameter of the UL element according to at least one of: a rule, a signaling received from a wireless communication node, or a reporting transmitted by the first wireless communication device.

8. The method of claim 7, wherein the signaling includes at least one of:

the value of the first parameter for a serving cell of the UL element; the value of the first parameter for the UL element;

the value of the first parameter for the UL element group which includes the UL element; or the value of the first parameter for an UL element set which includes one or more UL element groups, where at least one of the one or more UL element groups includes the UL element.

9. The method of claim 8, wherein one UL element group corresponds to one entry of a buffer size reporting.

10. The method of claim 1, wherein at least one of a serving cell, a bandwidth part (BWP) or a serving cell group includes more than one UL element set, where each of the more than one UL element set corresponds to a respective value of the first parameter.

11. The method of claim 1, wherein one serving cell group corresponds to more than one medium access control (MAC) entities.

12. The method of claim 1, wherein the UL element comprises at least one of: data of a logical channel, a medium access control control element (MAC-CE), uplink control information (UCI), a scheduling request (SR), or a medium access control (MAC) entity, or a piece of information.

13. The method of claim 1, wherein the UL grant comprises at least one of: a dynamically configured UL grant, a type I configured UL grant, or a type II configured UL grant.

14. The method of claim 1, wherein at least one of:

an UL channel, that corresponds to the UL grant, includes UL elements with a same value of a first priority and with a same value of the first parameter; or the UL channel, that corresponds to the UL grant, includes UL elements with a same or different value of a second priority and with a same value of the first parameter.

15. The method of claim 1, wherein at least one of the first parameter or the second parameter comprises at least one of:

a parameter of an uplink channel; a parameter of an UL grant; a control resource set (CORESET) pool index; a transmission-reception point (TRP) index; an index of a PUSCH group; an index of a PUCCH group; a physical cell index (PCI); a combination of the PCI index and a frequency parameter; an index of a logical channel group index; a set index of a set of logical channel groups; a medium access control (MAC) entity; an index of the MAC entity; an index of a spatial relationship; an index of a spatial relationship group; an index of an UL grant; or an index of a transmission configuration indicator (TCI) state group.

16. A method comprising:

receiving, by a wireless communication node from a wireless communication device, an uplink (UL) element according to a feature of the UL element, wherein the feature of the UL element is determined by the wireless communication device, wherein the feature of the UL element comprises a relationship between a value of a first parameter of the UL element and a value of a second parameter of a UL grant, wherein the UL element is associated with one or more values of the first parameter, and wherein the relationship between the value of the first parameter of the UL element and the value of the second parameter of the UL grant comprises that the value of the first parameter of the UL element includes the value of the second parameter of the UL grant, the first parameter of the UL element comprising at least one of: an index of the UL element or an index of an UL element group which includes the UL element; and receiving, by the wireless communication node from the wireless communication device, the UL element according to the UL grant when the value of the first parameter of the UL element includes the value of the second parameter of the UL grant.

17. The method of claim 16, wherein when multiple UL elements are associated with a same value of the first parameter, the multiple UL elements can be multiplexed for transmission through one channel, or can be multiplexed to one medium access control control element (MAC-CE).

18. The method of claim 17, wherein the one channel or the one MAC-CE is associated with the value of the second parameter, wherein the same value of the first parameter corresponds to the value of the second parameter and the one channel comprises at least one of: a transport channel or a physical channel.

* * * * *